United States Patent [19]

Suzuki

[11] Patent Number: 4,983,033

[45] Date of Patent: Jan. 8, 1991

[54] AUTOMATIC RANGE FINDER FOR CAMERA

[75] Inventor: Koji Suzuki, Tokyo, Japan

[73] Assignee: Asahi Kogaku Kogyo Kabushiki Kaisha, Tokyo, Japan

[21] Appl. No.: 52,341

[22] Filed: May 21, 1987

Related U.S. Application Data

[63] Continuation of Ser. No. 649,580, Sep. 12, 1984.

[30] Foreign Application Priority Data

Sep. 14, 1983 [JP] Japan .................. 58-169567

[51] Int. Cl.$^5$ ................................ G03B 13/36
[52] U.S. Cl. ........................... 356/4; 354/403
[58] Field of Search ......................... 354/403; 356/4

[56] References Cited

U.S. PATENT DOCUMENTS

| | | | |
|---|---|---|---|
| Re. 27,461 | 8/1972 | Harvey | 354/403 |
| 3,443,502 | 5/1969 | Harvey | 354/403 |
| 4,065,778 | 12/1977 | Harvey | 354/403 |
| 4,274,735 | 6/1981 | Tamura et al. | 354/403 |
| 4,288,152 | 9/1981 | Matsuda | 354/403 |
| 4,313,654 | 2/1982 | Matsui et al. | 354/403 |
| 4,322,141 | 3/1982 | Tominagu et al. | 354/403 |
| 4,470,681 | 9/1984 | Johnson | 354/403 |
| 4,522,492 | 6/1985 | Masunaga | 354/403 |
| 4,582,424 | 4/1986 | Kawabata | 354/403 |

Primary Examiner—Russell E. Adams
Attorney, Agent, or Firm—Sughrue, Mion, Zinn, Macpeak & Seas

[57] ABSTRACT

An automatic range finder for a camera for setting the focus position of the camera to correspond to the closest object to the camera within a specified field of view. Infrared light sources are sequentially activated to project infrared beams, through a light projecting lens, within the specified field of view. A condenser lens, positioned a predetermined base length apart from the optical axes of the light sources and having an optical axis parallel to that of the light projecting lens, focuses the returned beams onto a light detecting element having a light receiving surface arranged perpendicular to the optical axis of the condenser lens. The light detecting element produces a signal indicative of the positions of the sequential light spots received thereon. A signal processing circuit determines which value of the output signal of the light detecting element corresponds to the closest object, and sets the focus position of the camera accordingly.

3 Claims, 6 Drawing Sheets

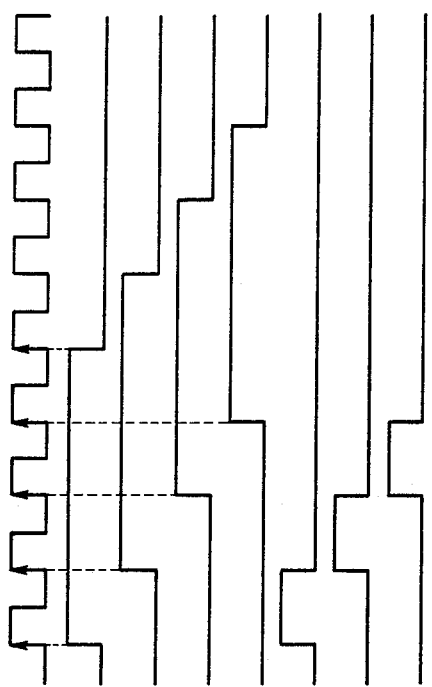

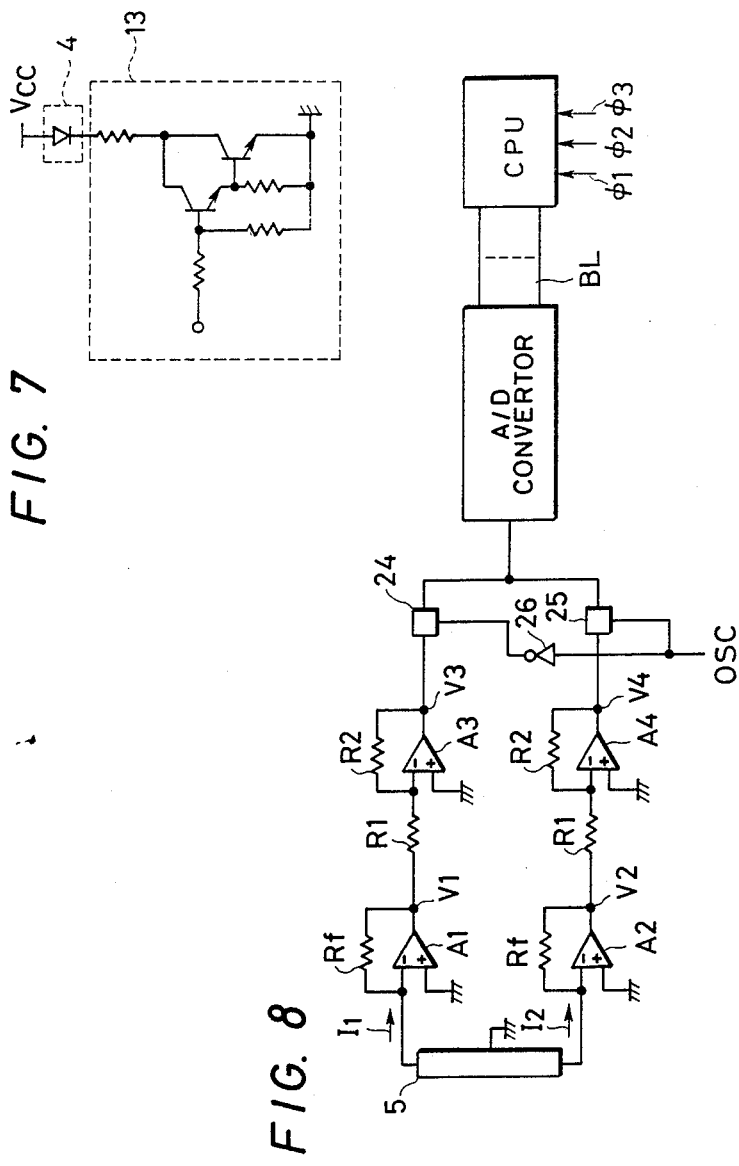

AUTOMATIC RANGE FINDER FOR CAMERA

This is a continuation of application Ser. No. 649,580, filed Sept. 12, 1984.

BACKGROUND OF THE INVENTION

The present invention relates to a range finder of a type employing a semiconductor optical position detecting element used, for instance, in a camera.

Automatic focusing devices using an infrared active system are well known in the art. In the so-called infrared active system, a thin infrared beam reflected from the object is detected to measure the distance from the object. This system is advantageous in that the distance can be accurately measured irrespective of the brightness or contrast of the ordinary light reflected from the object. Furthermore, it is unnecessary to scan a whole picture and to precisely focus the distance measuring optical system on the object.

The infrared active system extensively usually employs a semiconductor optical position detecting element (hereinafter referred to as a PSD when applicable). A conventional range finder using such a PSD is arranged as shown in FIG. 1. In FIG. 1, a light projecting lens 1 and a condenser lens 2 have a focal length f. A light beam from an infrared source 4 is applied through the light projecting lens 1 to an object 3. The light projecting lens 1 and the condenser lens 2 are set a base length D apart from each other, and the optical axis of the condenser lens 2 passes through the center of the PSD 5.

The condenser lens 2 gathers the light reflected from the object 3, thus forming a light spot at a point which is ΔL from the center of the PSD 5 and offset from the infrared source 4. As a result, currents $I_1$ and $I_2$, which are inversely proportional to the resistances between the position of the light spot and the electrodes A and B, respectively, flow to the electrodes A and B, respectively, of the PSD 5.

FIG. 2 shows a position detecting circuit 6. The circuit 6 includes a differential amplifier 7 for obtaining a differential current $I_D$ ($=I_1-I_2$) and a summing amplifier 8 for obtaining a sum current $I_A$ ($=I_1+I_2$). The circuit 6 further includes an analog divider 9 for obtaining a division current $I_d$ ($=I_D/I_A$). By dividing the current ID by the current IA, an accurate distance signal can be obtained at all times. The distance signal is independent of the intensity of the light reflected from the object.

In the position detecting circuit of FIG. 2, the output signal is obtained by processing currents; however, it may be obtained by processing voltages or by processing both currents and voltages in combination.

In the above-described conventional range finder, the infrared beam is very thin, the beam diameter at the object being not more than 10 cm. Therefore, if the main object to be photographed is located at the side of the picture, the infrared beam may not be applied to the object, and accordingly the distance thereto is measured with error.

In order to prevent this difficulty, a focus locking operation is generally carried out. That is, the camera is moved so that the object is at the center of the picture, and the shutter button is depressed halfway to apply the light beam to the object, thereby to measure the distance. Under this condition, the camera is moved back to the original position, and the shutter button completely depressed This operation is disadvantageous in that it is considerably troublesome In addition, an unskilled photographer often does not know how to conduct the focus locking operation and is thus liable to take many pictures out of focus. Even if the photographer is sufficiently skilled to use the focus locking operation, because it is time consuming, many picture taking opportunities are missed.

In most cases where pictures are taken out of focus, the composition is of two persons standing side by side. In such a composition, the light beam passes through the space between the two persons so that the background is focused. In the case of three persons, the central person is usually positioned at the center of the picture, and therefore the focusing light beam is correctly applied, and thus such pictures are taken in focus.

SUMMARY OF THE INVENTION

In view of the foregoing, an object of the invention is to provide a range finder with which a camera can be quickly and positively focused on an object even when the object is not at the center of the picture and with which even a beginner can readily bring the object into focus.

Achieving the foregoing and other objects, according to the invention, a range finder is provided comprising a plurality of infrared sources adapted to emit infrared beams for distance measurement arranged at predetermined intervals. These infrared sources are sequentially achieved thereby to obtain the same effect as in a conventional range finder in which the infrared source is manually scanned in one direction of the picture.

BRIEF DESCRIPTION OF THE DRAWINGS

FIG. 6 is a timing chart describing the operation of the preferred embodiment;

FIG. 7 is a circuit diagram showing an infrared source drive circuit used in the preferred embodiment;

FIG. 8 is a circuit diagram, partly as a block diagram, showing a position detecting circuit used in the preferred embodiment.

DESCRIPTION OF THE PREFERRED EMBODIMENTS

Figure 1:
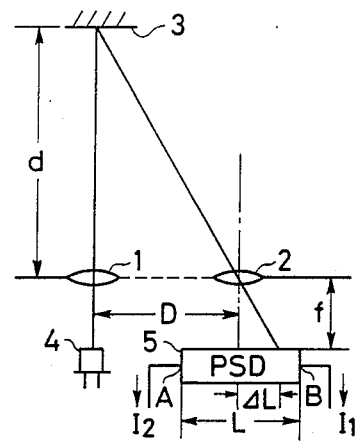
FIG. 1 is an explanatory diagram showing a conventional range finder.
Figure 2:
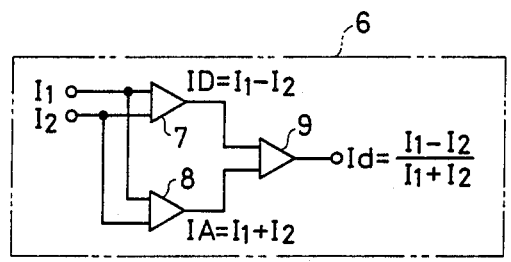
FIG. 2 is a block diagram showing a position detecting circuit used in the conventional range finder.

The invention will now be described with reference to preferred embodiments shown in FIGS. 3 through 9. In these figures, those components which have been previously described with reference to FIGS. 1 and 2 are therefore designated by the same reference numerals or characters.

Figure 3:
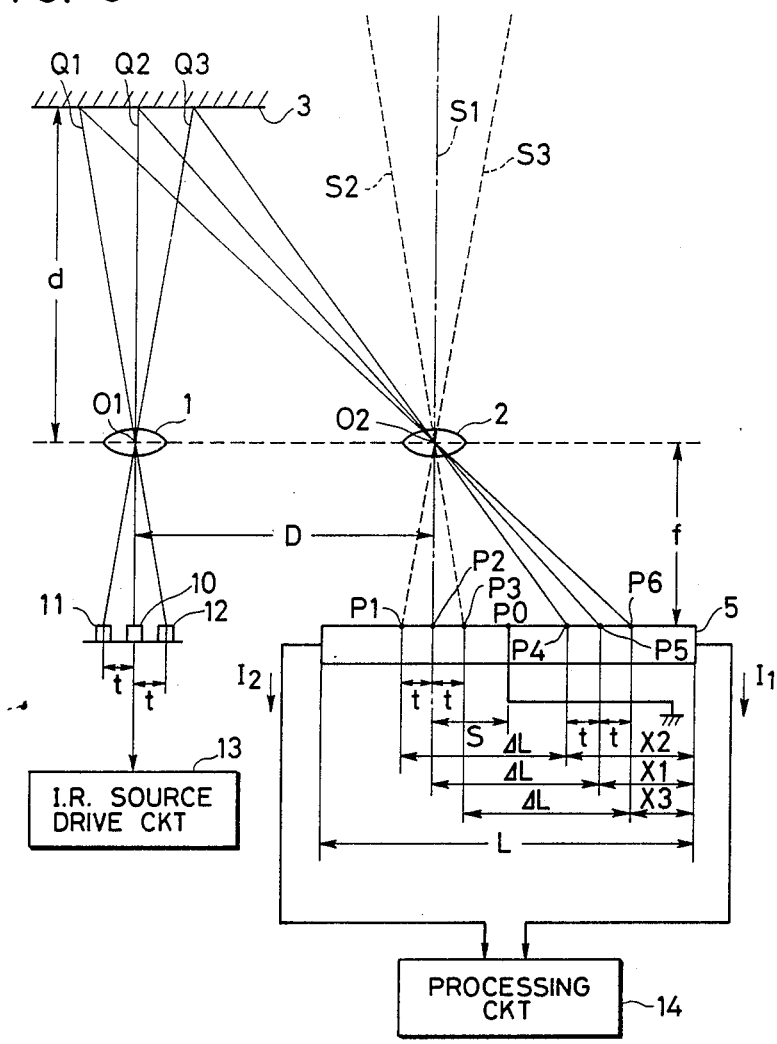
FIG. 3 is an explanatory diagram showing the overall arrangement of a preferred embodiment of a range finder of the invention.

FIG. 3 is an explanatory diagram showing the overall arrangement of an example of a range finder according to the invention. The light projecting lens 1 and the condenser lens 2 are set a base length D apart from each other. The optical axis of the condenser lens 2 is here set to pass through an arbitrary point $P_2$ on the PSD 5. Infrared sources 11 and 12 are set a distance t apart from an infrared source 10. Light beams from the sources are applied through the light projecting lens 1 to the object 3. The light beams reflected from the object 3 are gathered by the condenser lens, thus forming light spots on the light receiving surface of the PSD 5. The light receiving surface is arranged perpendicular to the optical axis of the condenser lens 2.

The positions of the light spots with respect to the infrared sources 10, 11 and 12 and designated by $P_5$, $P_4$ and $P_6$ are $\Delta L$ apart from the positions $P_2$, $P_1$ and $P_3$, respectively, of the light spots when the objects is at infinity. When the object is at infinity, the light beams from the infrared sources 10, 11 and 12 are reflected by the object 3 and applied to the PSD 5 passing along optical paths $S_1$, $S_3$, $S_2$, thus forming the light spots at the positions $P_2$, $P_1$ and $P_3$, respectively The positions $P_2$, $P_1$ and $P_3$ are referred to as the reference points for the infrared sources 10, 11 and 12, respectively.

By geometrical consideration, the distance between the points $P_1$ and $P_2$ and the distance between the points $P_2$ and $P_3$ are t. A triangle obtained by joining the points $O_1$, $Q_2$ and $O_2$ is similar to a triangle obtained by joining the points $P_2$, $O_2$ and $P_5$. Therefore $\Delta L = D \cdot f/d$. Similarly, a triangle obtained by joining the points $O_1$, $Q_1$ and $O_2$ is similar to a triangle obtained by joining the points $P_3$, $O_2$ and $P_6$, and a triangle obtained by joining the points $O_1$, $Q_3$ and $O_2$ is similar to a triangle obtained by joining the points $P_1$, $O_2$ and $P_4$. Therefore, the distance between the points $P_1$ and $P_4$ and the distance between the points $P_3$ and $P_6$ are $\Delta L$. That is, when the object moves with respect to the infrared sources, the amounts of movement of the light spots on the PSD 5 are equal The amounts of movement are determined by the distance d between the object and the lenses, the base length D, and the focal length f of the lenses.

An infrared source drive circuit 13 operates to cause the infrared sources 10, 11 and 12 to emit light successively. A processing circuit 14 is provided which includes an A/D converter and a CPU In the processing circuit, the A/D converter converts the output currents of the PSD 5 into digital values, and the CPU obtains the sum and the difference of the output currents $I_1$ and $I_2$ of the PSD 5 and computes the ratio therebetween, whereby a distance signal $I_o$ is obtained as:

$$I_o = (I_1 - I_2)/(I_1 + I_2).$$

A predetermined value is added to a distance signal which is generated when the infrared source 11 emits light, and a predetermined value is subtracted from a distance signal which is provided when the infrared source 12 emits light so as to correct the deviation of the distance signal which is caused by movement of the reference point.

When the reference point is at the center of the PSD 5, that is, when the optical axis of the condenser lens extends through the center of the PSD 5, and the object 3 is at infinity, the currents $I_1$ and $I_2$ are equal and the distance signal $I_o$ is zero. When the length $\Delta L$ ($=D\cdot f/d$) is $L/2$, that is, when $d = 2\cdot D\cdot f/L$, the distance signal $I_o$ is a maximum, following a characteristic as indicated by a straight line $T_o$ in FIG. 4.

Figure 4:
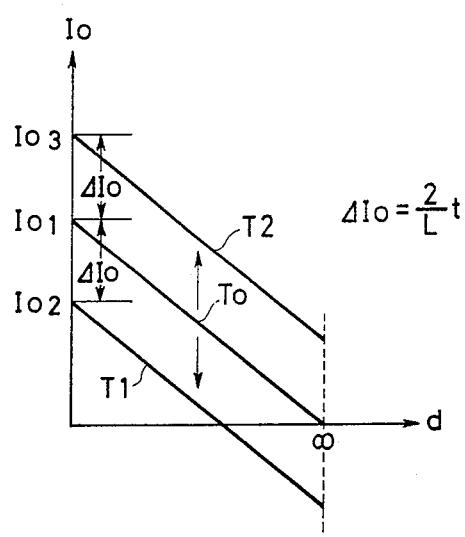
FIG. 4 is a characteristic diagram used for a description of the operation of the embodiment of FIG. 3.

When the reference point is moved from the center of the PSD 5 towards the side of the current $I_2$, the distance signal shows a characteristic as indicated by a straight line $T_1$ in FIG. 4. In this case, the value of the distance d when the distance signal $I_o$ becomes zero is shifted from the side of infinity to the side of short distance. When the object is positioned infinitely away from the optical system, the distance signal $I_o$ is negative.

On the other hand, when the reference point is moved from the center of the PSD 5 towards the side of the current $I_1$, the distance signal shows a characteristic as indicated by straight line $T_2$. In this case the distance signal $I_o$ is positive at all times. In FIG. 4 the lines $T_o$, $T_1$ and $T_2$ are parallel to one another. When a distance from the object is determined the difference between distance signals on the lines $T_o$ and $T_1$ at that time is $\Delta I_o$, and the difference between distance signals on the lines $T_o$ and $T_2$ at that time is also $\Delta I_o$.

It is assumed that the optical axis of the condenser lens 2 extends through the center of the PSD 5. The output currents of the electrodes are inversely proportional to the distance to the respective electrodes. Therefore:

$$I_1 = I_p \cdot (R_L - R_x)/R_L, \text{ and}$$

$$I_2 = I_p \cdot R_x/R_L,$$

where $R_L$ is the resistance of the PSD 5, $R_x$ is the resistance of a part of the PSD 5 between the electrode for the current $I_1$ and a light incidence position and has a length x, and $I_p$ is the photocurrent which is produced by the incident light.

If the resistance layer of the PSD 5 is uniform so that position is proportional to resistance, then:

$$I_1 = I_p \cdot (L-x)/L, \text{ and}$$

$$I_2 = I_p \cdot x/L.$$

Therefore, the distance signal $I_o$ is as follows:

$$\begin{aligned} I_o &= (I_1 - I_2)/(I_1 + I_2) \\ &= \{(L-x)/L - (x/L)\}/\{(L-x)/L + (x/L)\} \\ &= 1 - 2\cdot x/L. \\ x &= L/2 - \Delta L, \text{ and therefore:} \\ I_o &= 1 - (2/L)\{(L/2) - \Delta L\} \\ &= (2/L)\Delta L. \end{aligned}$$

When the reference point is moved by the distance t towards the side of the current $I_1$, $x = (L/2) - \Delta L - t$, and therefore:

$$\begin{aligned} I_o &= 1 - (2/L)\{(L/2) - \Delta L - t\} \\ &= (2/L)\cdot \Delta L + (2/L)\cdot t. \end{aligned}$$

Thus, the distance signal $I_o$ is increased by $(2/L)\cdot t$.

When, on the other hand, the reference point is moved by the distance t towards the side of the current $I_2$, $x = (L/1) - \Delta L + t$, and therefore:

$$\begin{aligned} I_o &= 1 - (2/L)\{(L/2) - \Delta L + t\} \\ &= (2/L)\Delta L - (2/L)\cdot t \end{aligned}$$

Thus, the distance signal $I_o$ is decreased by $(2/L)\cdot t$.

The case will now be considered where, as shown in FIG. 3, the optical axis of the condenser lens 2 is at a distance s from the center $P_o$ of the PSD 5 towards the side of the current $I_2$.

If the points $P_4$, $P_5$ and $P_6$ are at distances $x_2$, $x_1$ and $x_3$ from the end of the PSD 5, then:

$$x_1 = (L/2) - \Delta L + s,$$

$$x_2 = (L/2) - \Delta L + s + t, \text{ and}$$

$$x_3 = (L/2) - \Delta L + s - t.$$

Therefore, the corresponding distance signals are as follows:

$$\begin{aligned}
I_o(x_1) &= 1 - (2/L) \cdot x_1 \\
&= 2(\Delta L/L) - 2(s/L) \\
I_o(x_2) &= 1 - (2/L) \cdot x_2 \\
&= 2(\Delta L/L) - 2(s/L) - 2(t/L) \\
I_o(x_3) &= 1 - (2/L) \cdot x_3 \\
&= 2(\Delta L/L) - 2(s/L) - 2(t/L)
\end{aligned}$$

With $I_o(x_1)$ as a reference, $I_o(x_2)$ is smaller by $2(t/L)$ than $I_o(x_1)$, and $I_o(x_3)$ is larger by $2(t/L)$.

The amount of deviation of the distance signal is determined only by the length L of the PSD 5a and the distance t between the infrared sources 10, 11 and 12. Therefore, if the amount of deviation is calculated and a distance correcting signal corresponding to the amount of deviation thus calculated is added to or subtracted from the present distance signal, then the resultant distance signal is equal to the preceding distance signal. That is, when the reference point is shifted, the distance signal is corrected.

The largest of the three distance signals is utilized for distance measurement. That is, a plurality of distance signals provided by a plurality of light sources are applied to the position detecting circuit shown in FIG. 8, and the focus is set according to the distance signal of the object which is the closest to the camera. Therefore, the camera is focused on the object which is the closest to the camera This setting produces the best overall focus, considering depth of field principles, in that objects which are farther from the camera than the closest object are also brought into focus.

Figure 5:
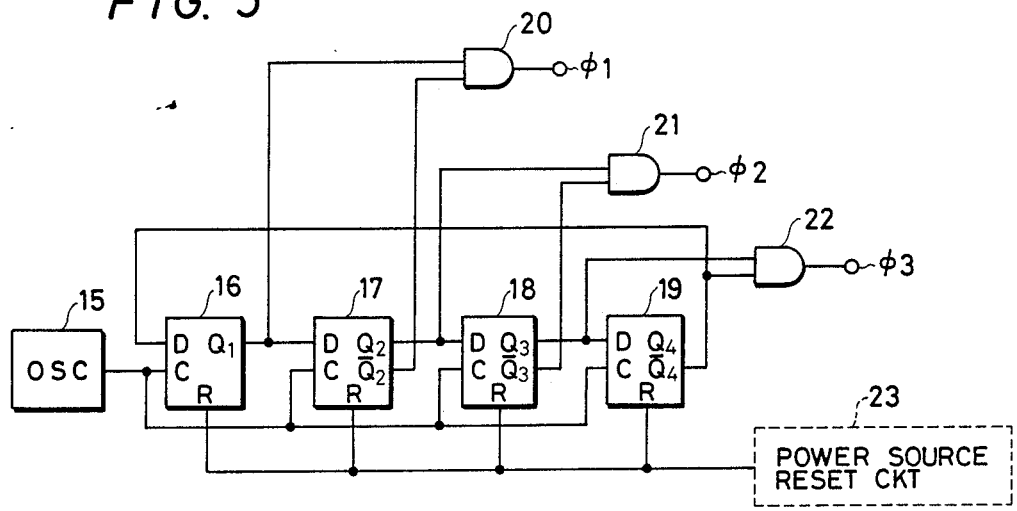
FIG. 5 is a diagram showing a pulse generating circuit used in the preferred embodiment.

FIG. 5 shows an example of an infrared source drive circuit 13 which is implemented digitally. In the circuit 13, an oscillator 15 produces a 1 KHz square wave, and D flip-flops 16 through 19 form a shift register. The output terminal $\overline{Q}$ of the D flip-flop 19 is connected to the input terminal D of the D flip-flop 6. A power source reset circuit 23 is connected to the terminals R of the D flip-flops 16 through 19 so that, when the power switch is turned on, the outputs Q are set to the low logical level "0". The terminals Q1 and $\overline{Q}2$ are connected to an AND gate 20, the terminals Q2 and $\overline{Q}3$ are connected to an AND gate 21, and the terminals Q3 and $\overline{Q}4$ are connected to an AND gate 22.

FIG. 6 is a timing chart describing the operation of the infrared source drive circuit. Waveform (a) of FIG. 6 is the pulse signal outputted by the oscillator 15, and the waveforms (b) through (e) are output signals provided by the D flip-flops 16 through 19, respectively. As is clear from FIG. 6, these output signals are raised to a high logical level "1" in response to the rise of the pulse signal When the output Q of the D flip-flop 19 is raised to "1", a "0" signal is applied to the terminal D of the D flip-flop 16. Therefore, the output Q of the D flip-flop 16 is set to "0" by the rise of the next pulse signal, and the outputs Q of the other D flip-flops 17, 18 and 19 are set to "0" sequentially. The waveforms (f), (g) and (h) of FIG. 6 are the output signals of the AND gates 20, 21 and 22, respectively. These signals are produced only once after the power switch is turned on.

FIG. 7 is a circuit diagram showing an example of the infrared source drive circuit 13. The drive circuit 13 uses the output signals of the AND gates 20, 21 and 22 to drive the infrared sources. Each infrared source is an infrared ray emitting diode. In the drive circuit, transistors are Darlington connected to supply a large current. The drive circuit shown in FIG. 7 is connected to each of the AND gates 20, 21 and 22 so that the drive circuits drive the infrared sources 10, 11 and 12, respectively.

FIG. 8 shows an example of the position detecting circuit in the range finder according to the invention. If the feedback resistances of operational amplifiers $A_1$ and $A_2$ for current-to-voltage conversion are represented by Rf, then:

$$V_1 = R_f I_4, \text{ and}$$

$$V_2 = R_f I_2.$$

If the output resistance and the feedback resistance of each of the inverting amplifiers A3 and A4 are represented by $R_1$ and $R_2$, respectively, then:

$$\begin{aligned}
V_3 &= -(R_2/R_1) \cdot V_1 \\
&= (R_f \cdot R_2/R_1) \cdot I_1, \text{ and} \\
V_4 &= -(R_2/R_1) \cdot V_2 \\
&= (R_f \cdot R_2/R_1) \cdot I_2.
\end{aligned}$$

The operational amplifiers $A_1$ and $A_2$ convert the current signals to voltage signals. The voltage signals are amplified by the inverting amplifiers $A_3$ and $A_4$ to suitable levels.

In FIG. 8, a pulse signal OSC is applied to an inverter 26. When the pulse signal OSC is at "1", a voltage $V_4$ is applied to an A/D converter When the pulse signal OSC is at "0", a voltage $V_3$ is applied to the A/D converter. The voltage $V_3$ or $V_4$ is converted to a digital value by the A/D converter, and the digital value is applied through a bus line BL to a CPU. The CPU is a centralized control circuit used to control all operations and displays of the camera The mechanism of the camera operates according to commands from the CPU. In FIG. 8, reference numerals 24 and 25 designate analog switches.

The infrared source driving pulse signal shown in FIG. 6 may be produced by executing a designated program by the CPU. In this case, the circuit shown in FIG. 5 can be eliminated. The sum $(V_3+V_4)$ of the voltages $V_3$ and $V_4$ which have been converted into digital values by the A/D converter, the difference $(V_3-V_4)$ therebetween, and the quotient $(V_3-V_4)/(V_3+V_4)$ may be digitally calculated by the CPU. Furthermore, the circuit may be so designed that signals indicating the light emissions of the infrared sources are applied to the CPU so that a digital value corresponding to the deviation $(2t/L)$ of the distance signal due to the movement of the reference point is added to or subtracted from the distance signal to correct the latter.

Figure 9:
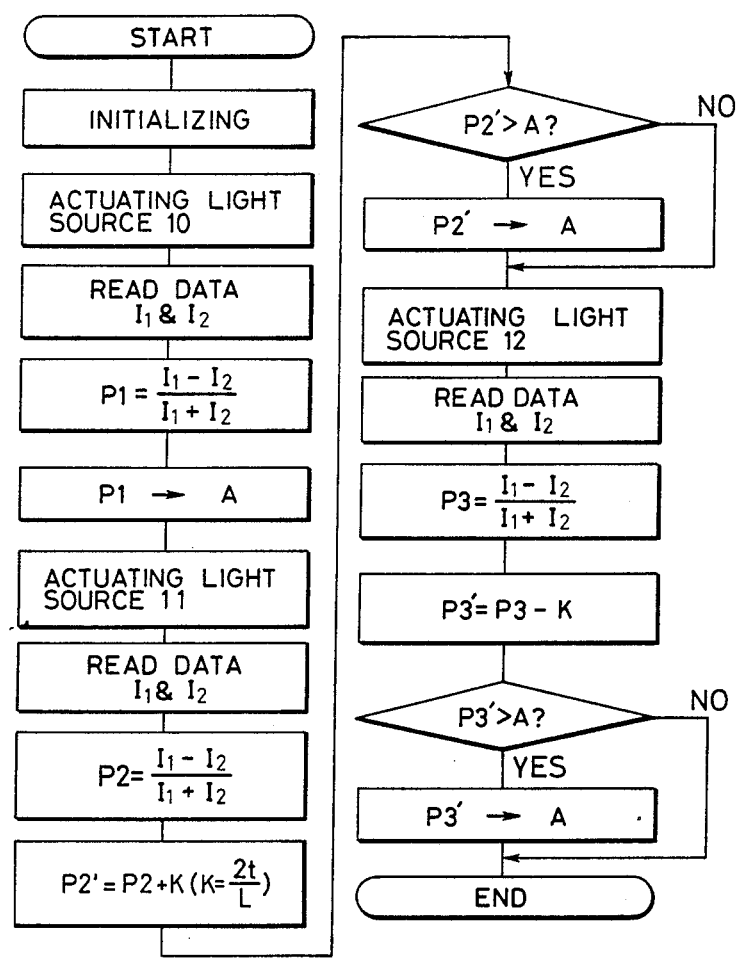
FIG. 9 is a flow chart indicating the operation of the preferred embodiment.

FIG. 9 is a flow chart showing a distance measurement operation performed with the above-described range finder.

In the above-described embodiment, three infrared sources are employed; however, the number of infrared sources may be increased. If the number of infrared sources is increased, then the distance measurement zone can be expanded to cover more of the picture area. However, if the distance measurement zone is excessively increased, even in the case where an object to be photographed is positioned at the center of the picture, another object which may desirably be out of focus and is at the side of the picture may be the closest to the camera and will cause the camera to be focused thereon. Accordingly, it is preferable that the infrared sources be so arranged that the distance measurement zone covers about 60% of the area of the picture.

As described above, in the range finder of the invention, a plurality of infrared sources are provided to increase the distance measurement zone. According to the invention, of the objects in the distance measurement zone thus established, the object closest to the camera is focused on. Therefore, pictures which are in focus can be readily and quickly taken. Moreover, compared with the conventional range finder, the range finder of the invention is low in manufacturing cost and high in durability.

I claim:

1. A range finder, comprising;
   a plurality of light sources for applying a plurality of infrared beams to an object for distance measurement;
   an infrared source drive circuit for causing said plurality of light sources to sequentially emit infrared beams;
   a light projecting lens provided on optical axes of said light sources;
   a condenser lens positioned a predetermined base length apart from said optical axes of said light sources, an optical axis of said condenser lens being parallel to an optical axis of said light projecting lens;
   said light projecting lens and said condenser lens being fixed in position relative to said light sources,
   a light detecting element having a light receiving surface arranged perpendicular to said optical axis of said condenser lens, said light detecting element producing first and second signals indicative of a position of a light spot on said light receiving surface;
   said light sources being positioned apart from one another by a predetermined uniform distance; and
   processing circuit means for determining, for values of said first and second signals produced by said light detecting element for each of said light sources, which of said values corresponds to an object closest to said range finder and for setting a focus position of said camera in accordance with said determination, said processing circuit means including means for correcting a value obtained from said first and second signals in accordance with a distance correction signal having a magnitude determined in accordance with said uniform distance.

2. The range finder of claim 1, wherein said light sources and said light projecting lens are arranged to apply said infrared beam over an area of approximately 60% of a central portion of a picture composed with said range finder.

3. The range finder of claim 1, wherein said signal processing means comprises first amplifier means for converting said current signals to voltage signals, second amplifier means for amplifying outputs of said first amplifying means, analog-to-digital converter means for converting outputs of said second amplifying means to digital form, and central processing means receiving as inputs outputs of said analog-to-digital converter means.

* * * * *